July 24, 1962
W. C. BELK ET AL
3,045,729
APPARATUS FOR SECTIONIZING CITRUS FRUIT
HAVING A VIBRATING BLADE
Filed June 26, 1959
9 Sheets-Sheet 1
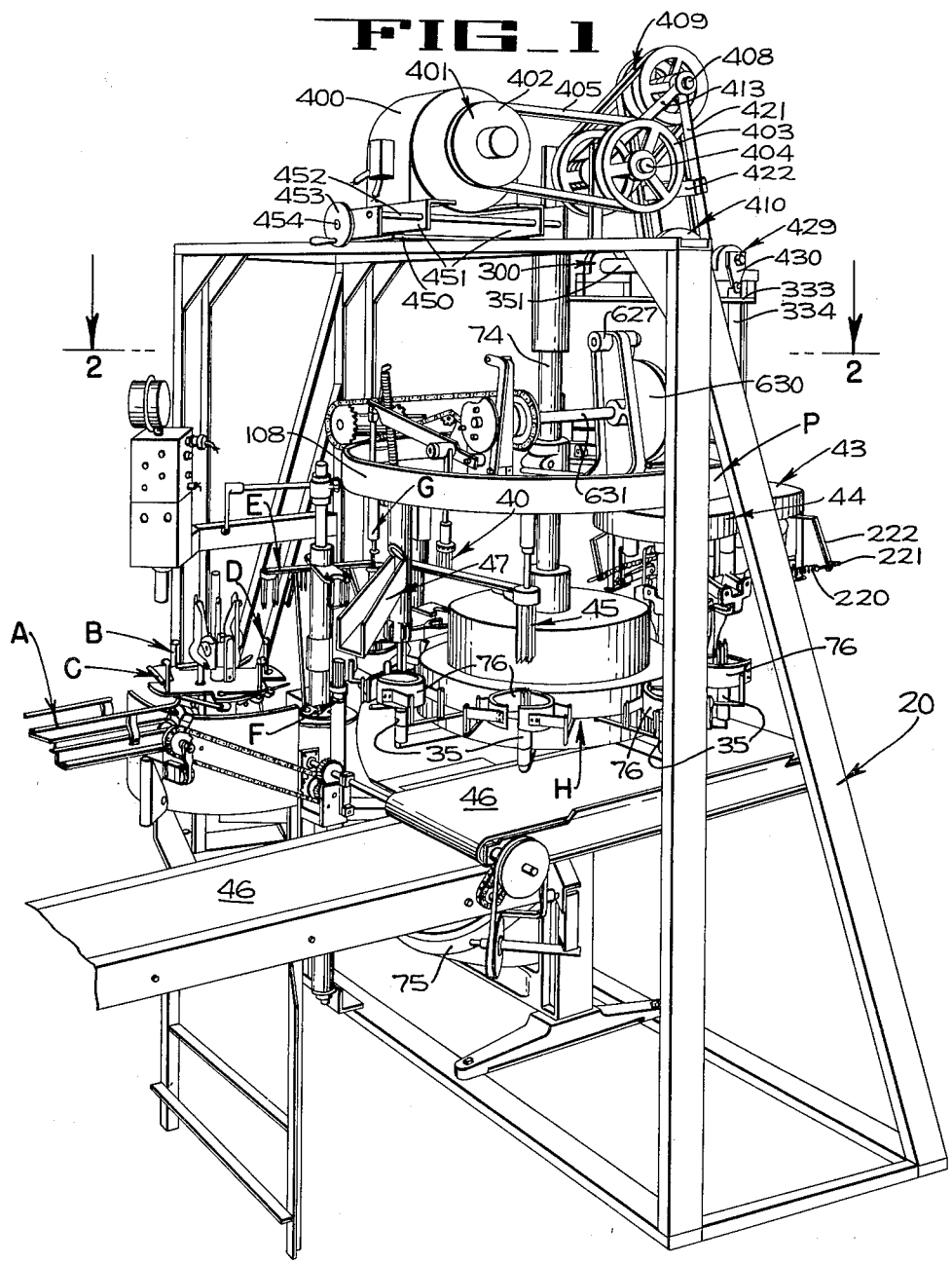
INVENTORS
WILBER C. BELK
RALPH POLK, JR
BY *Hans G. Hoffmeister*
ATTORNEY

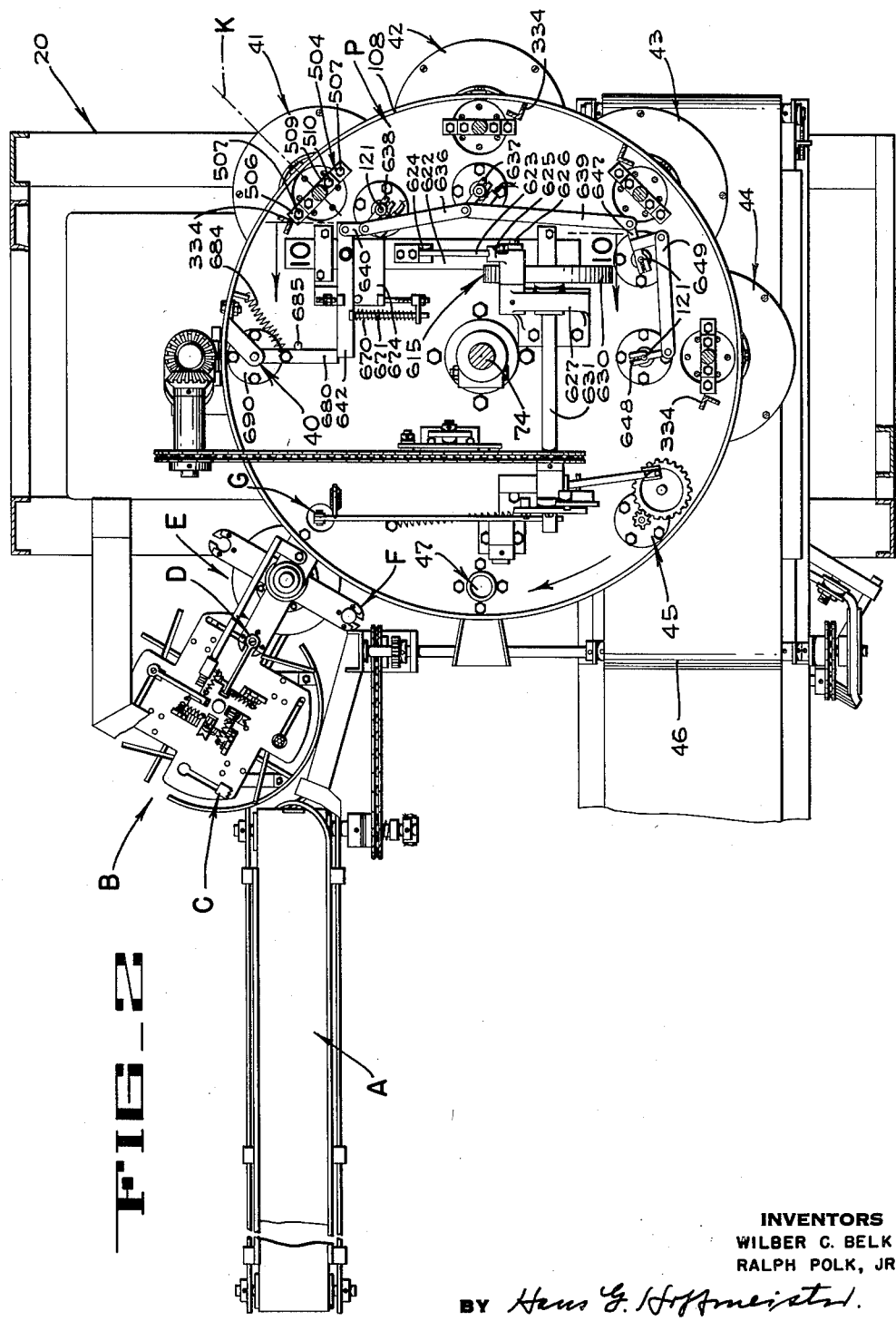

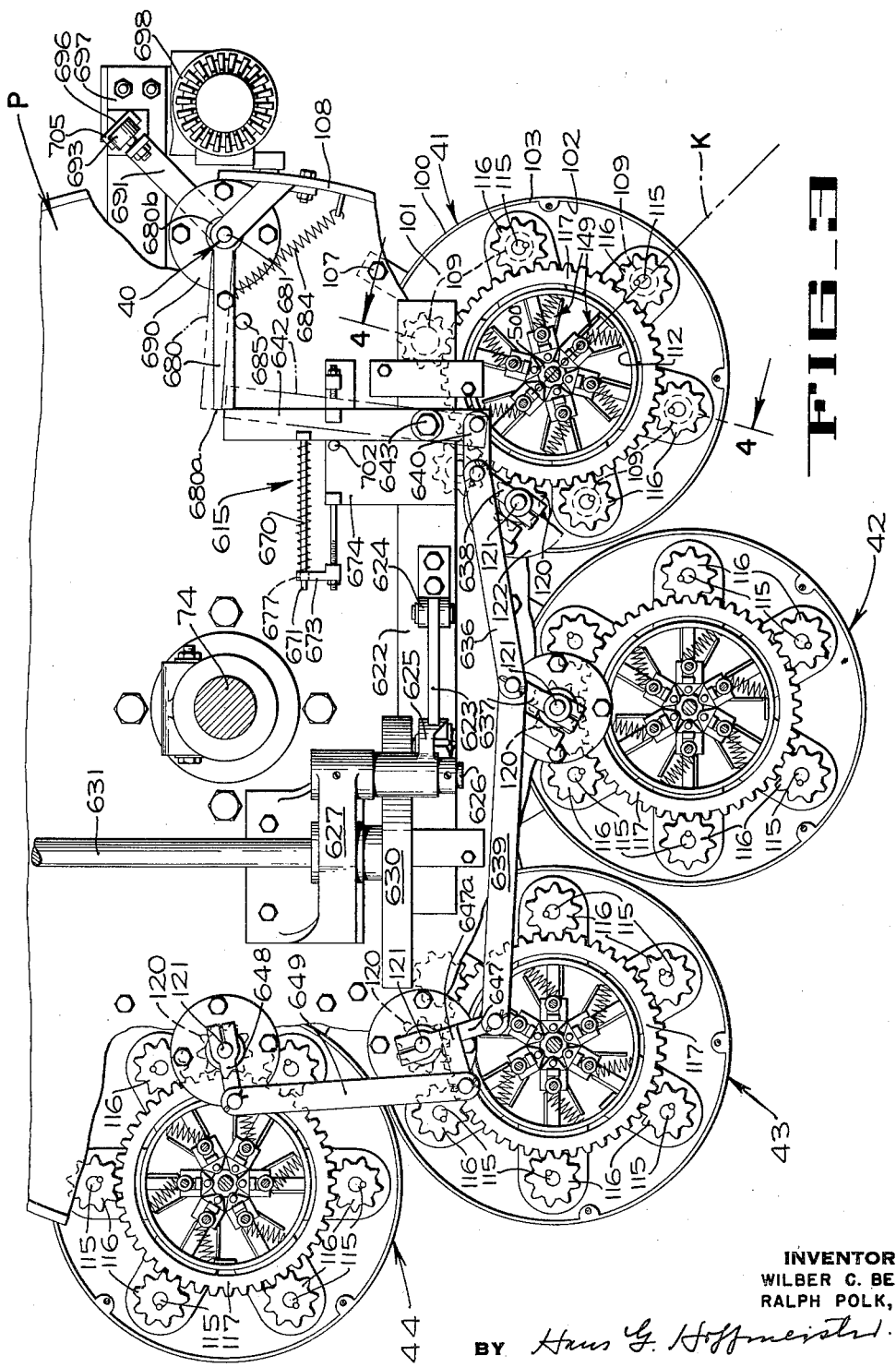

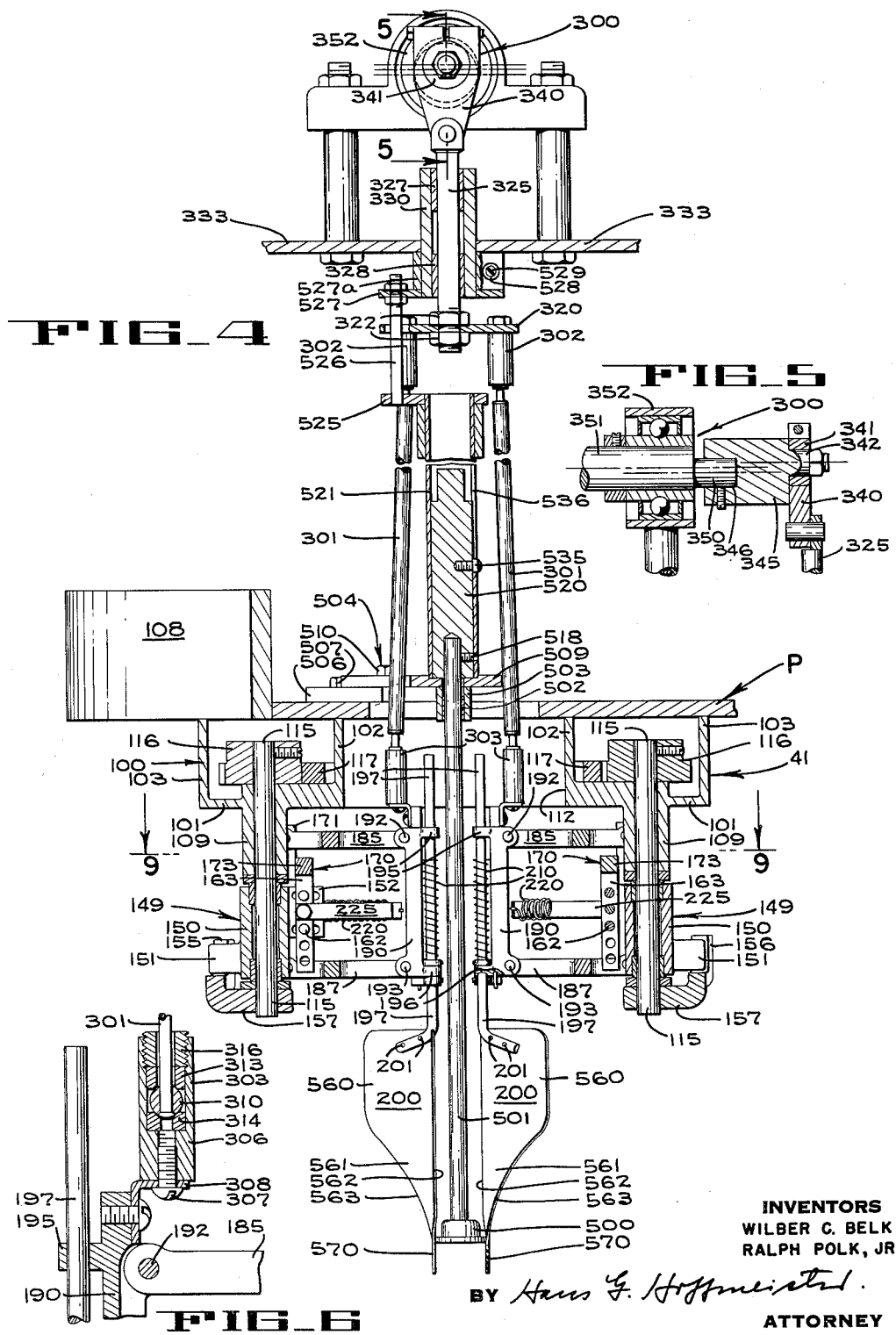

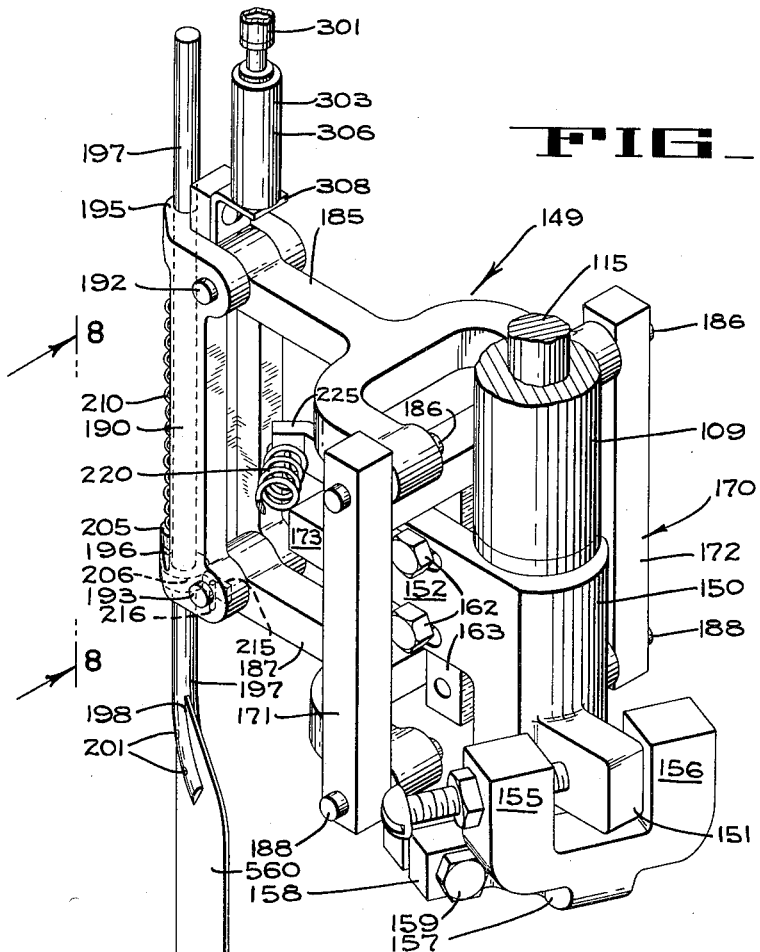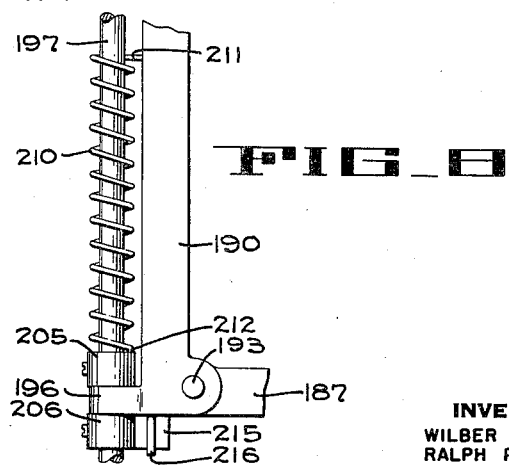

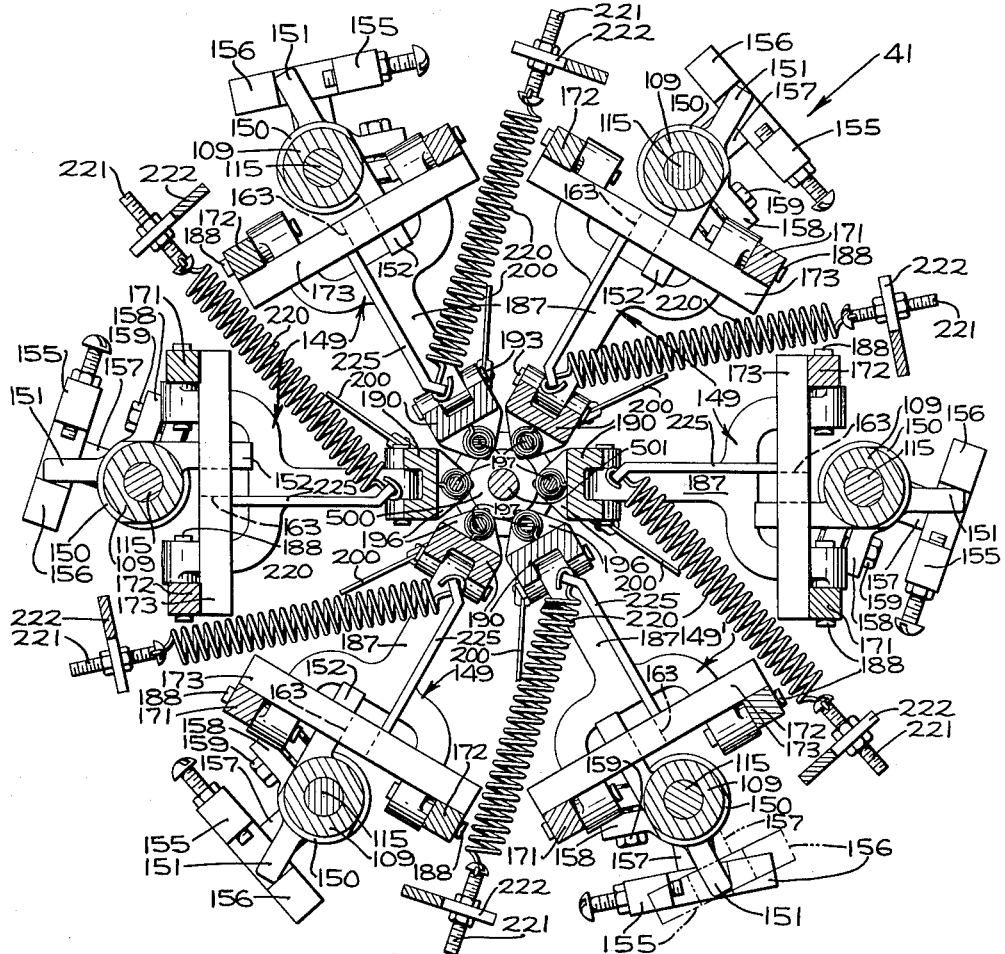
FIG_9
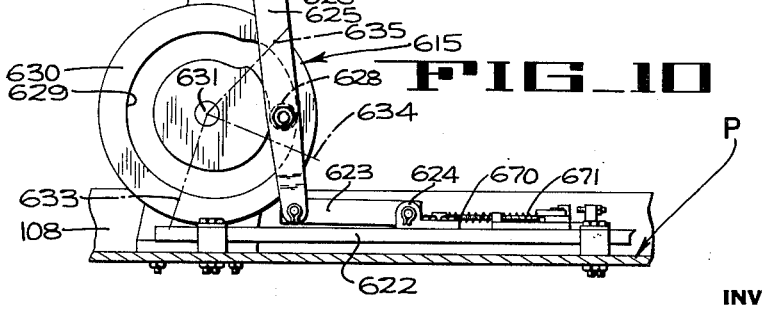
FIG_10
INVENTORS
WILBER C. BELK
RALPH POLK, JR.
BY *Hans G. Hoffmeister*
ATTORNEY

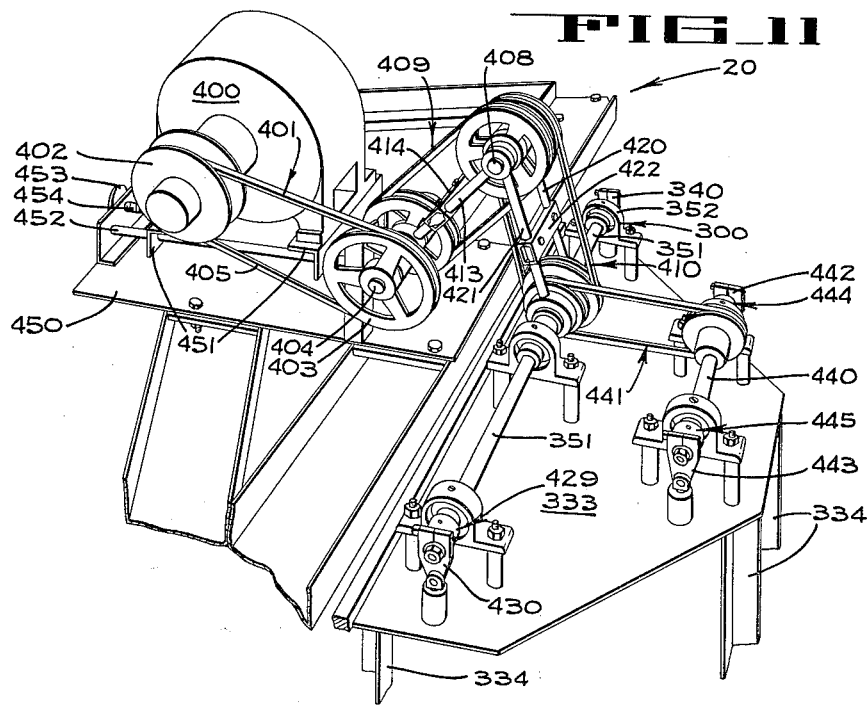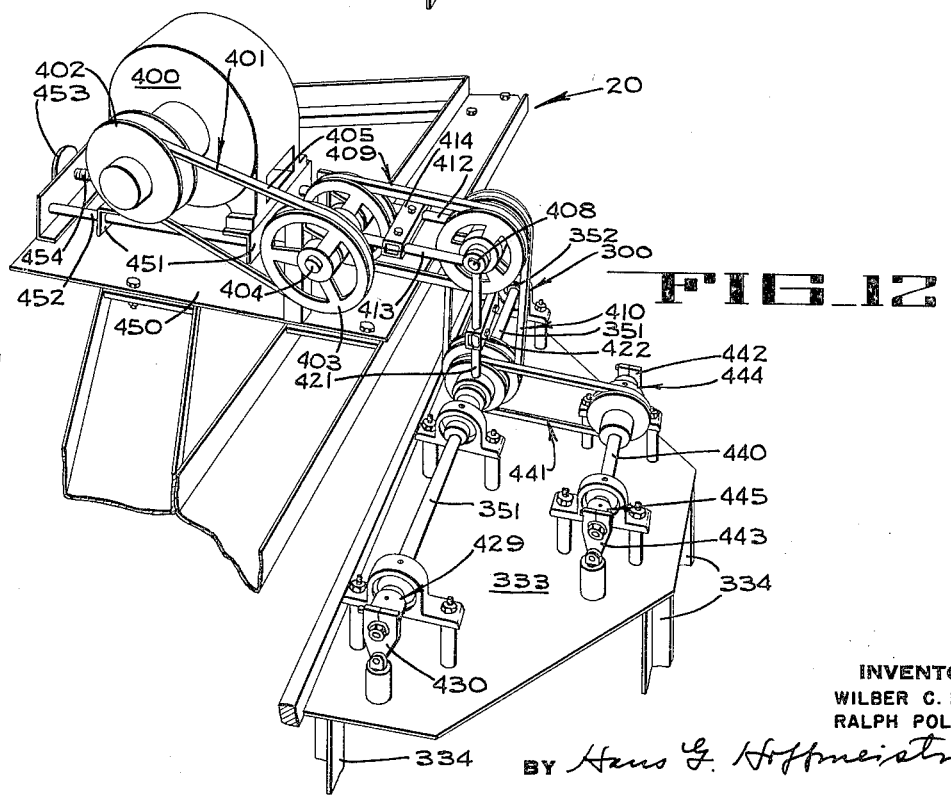

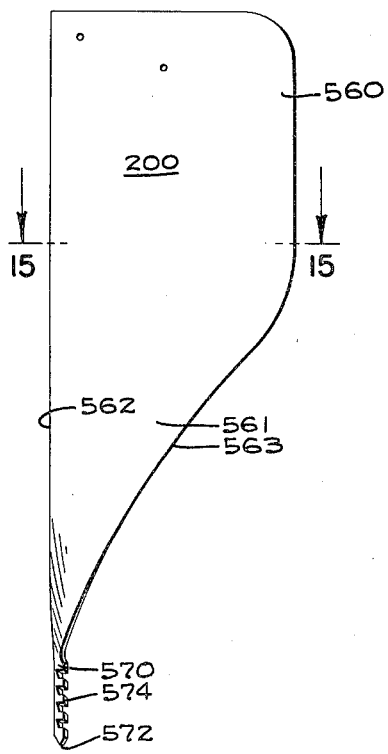
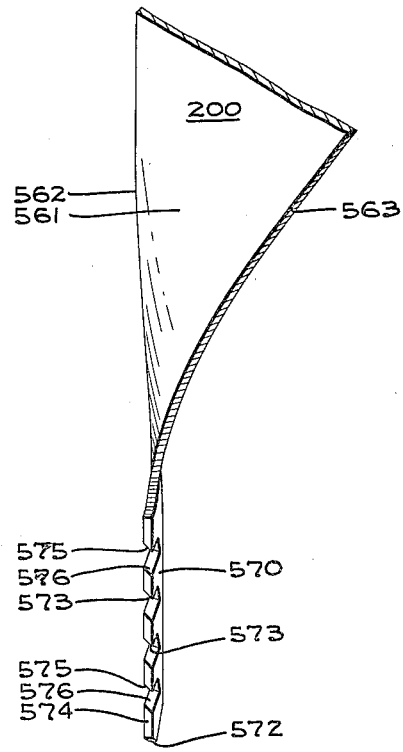
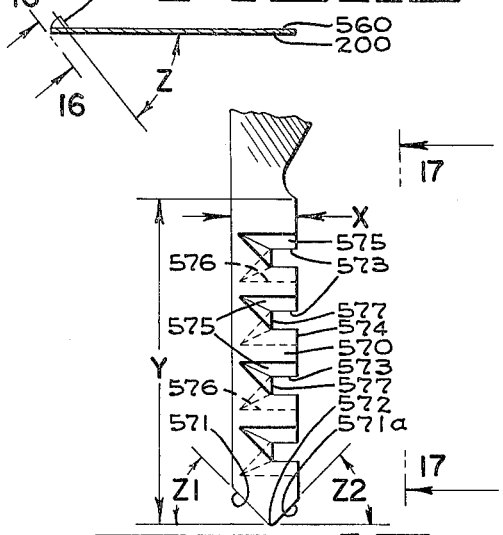
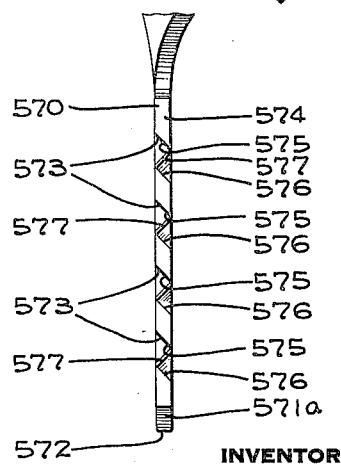

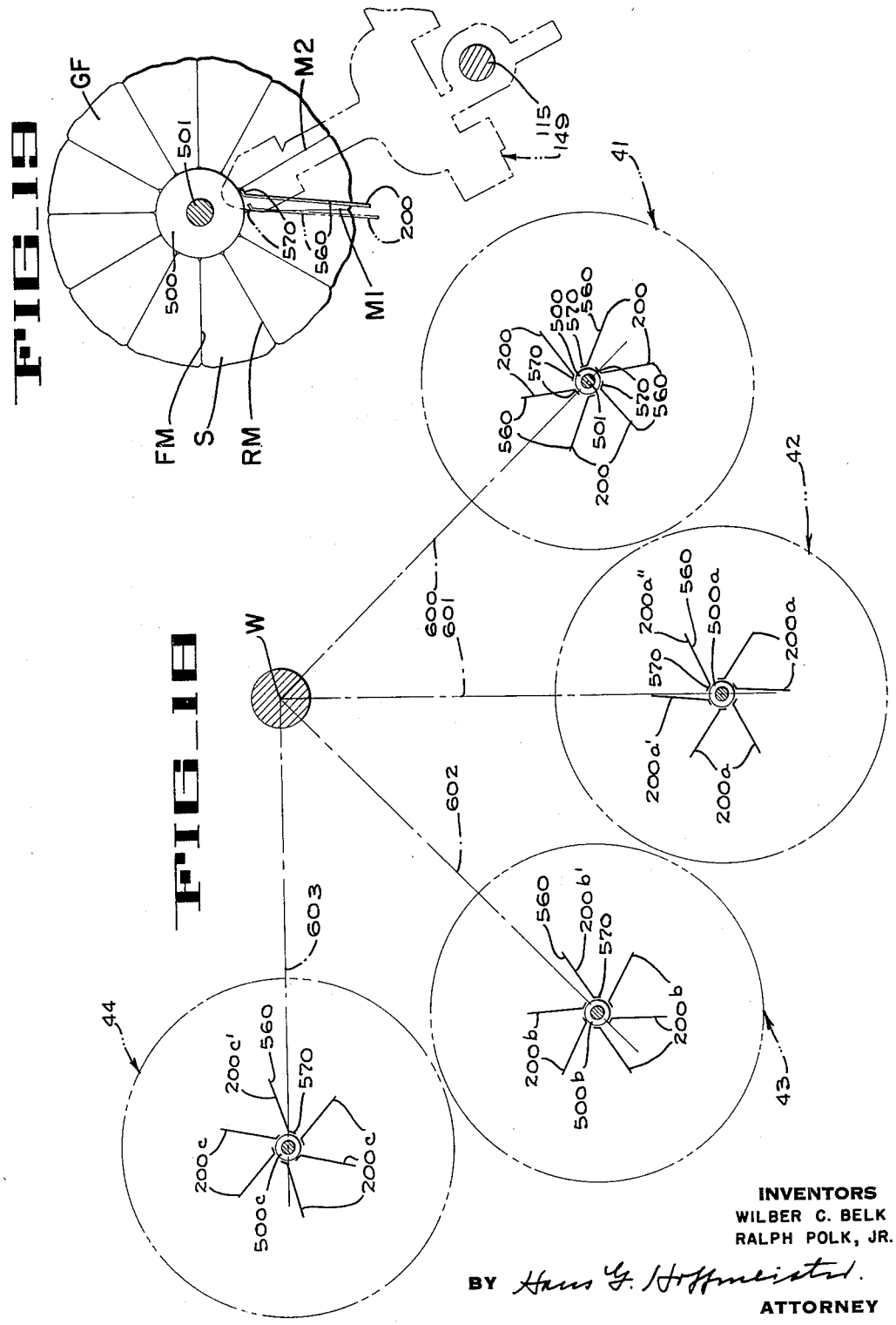

United States Patent Office 3,045,729
Patented July 24, 1962

3,045,729
APPARATUS FOR SECTIONIZING CITRUS FRUIT
HAVING A VIBRATING BLADE
Wilber C. Belk, Lakeland, and Ralph Polk, Jr., Tampa,
Fla.; said Belk assignor to FMC Corporation, a corporation of Delaware
Filed June 26, 1959, Ser. No. 823,176
19 Claims. (Cl. 146—3)

This invention pertains to apparatus for processing citrus fruit, and more particularly relates to an improved apparatus for sectionizing citrus fruit.

The meat or juice-bearing portion of citrus fruit is composed of groups of interconnected juice sacs, each group being in the form of a segmental section which is surrounded by a membrane. The portions of the segment wall, which extend more or less radially from the core of the whole fruit and define the plane faces of the segment, are referred to as radial membranes, while the portion of the segment wall which lies adjacent the peel of the fruit and defines the spherical face of the segment is called the outer membrane.

In the citrus fruit industry, "sectionizing" is an operation by which the naturally-shaped, membrane-free meat segments are removed from the citrus fruit, particularly grapefruit, and this operation is generally performed by first peeling off the outer skin and albedo, subjecting the fruit to a hot lye treatment to remove the outer membrane from the segments, and stripping individually the segmental juice sac groups from their radial membranes. The stripping operation is usually carried out manually by inserting a blade between the meat segments and each radial membrane and then cutting the meat segment loose from the membrane. Such manual sectionizing is inefficient since the speed at which the operators must work makes it impossible for them to handle small, irregular meat segments or to carefully cut loose even the larger meat segments.

Machines previously proposed for sectionizing grapefruit had met with limited success due to the fact that the segments in grapefruit vary in number between 9 and 16 in the average fruit and usually are of unequal size and shape. In addition, the radial membranes seldom extend in true radial directions or in flat planes. These and other variable characteristics of citrus fruit make it difficult to use a sectionizing machine to obtain well-formed, membrane-free meat segments in their natural size without excessive rupturing of the juice sacs of the meat.

It is therefore an object of the present invention to provide an improved fruit processing machine.

Another object is to provide an improved mechanism for controlling the vertical and horizontal movement of the blades of a citrus fruit sectionizing machine.

Another object is to provide an improved machine for sectionizing citrus fruit.

Other and further objects and advantages of the present invention will become apparent from the following description taken in connection with the accompanying drawings, in which:

FIG. 1 is a more or less diagrammatic perspective of the grapefruit sectionizing machine of the present invention, with parts broken away.

FIG. 2 is a horizontal section taken on line 2—2 of FIG. 1.

FIG. 3 is an enlarged fragmentary plan view of a portion of the machine of FIG. 2, with parts broken away.

FIG. 4 is an enlarged fragmentary vertical section taken substantially on line 4—4 of FIG. 3.

FIG. 5 is a fragmentary vertical section taken on line 5—5 of FIG. 4.

FIG. 6 is an enlarged vertical section taken through one of the universal joints used in the mechanism of FIG. 4.

FIG. 7 is an enlarged perspective, with parts broken away, of one of the blade control units associated with each head of the grapefruit machine of FIG. 1.

FIG. 8 is a fragmentary side elevation of a portion of the unit of FIG. 7, the view being taken in the direction indicated by arrows 8—8 of FIG. 7.

FIG. 9 is an enlarged horizontal section taken on line 9—9 of FIG. 4.

FIG. 10 is an enlarged vertical section taken on line 10—10 of FIG. 2.

FIGS. 11 and 12 are fragmentary perspectives particularly showing the eccentric driving mechanism mounted on the upper end of the frame of the machine of FIG. 1.

FIG. 13 is an elevation of a sectionizing blade used in the machine of the present invention.

FIG. 14 is an enlarged fragmentary perspective view of the blade of FIG. 13 particularly showing the angular relationship of the upper and lower portions of the blade.

FIG. 15 is a section taken on line 15—15 of FIG. 13.

FIG. 16 is an enlarged elevation of the lower end of the blade, the view being taken looking in the direction indicated by arrows 16—16 of FIG. 15.

FIG. 17 is an elevation of the lower end of the blade, the view taken looking in the direction of arrows 17—17 of FIG. 16.

FIG. 18 is a schematic view of substantially the same mechanism as seen in FIG. 3, particularly showing the orientation of the blades of the several heads of the machine.

FIG. 19 is a diagrammatic view showing the operating position of one of the blades of a sectionizing head in operative position in a grapefruit.

The improved sectionizing mechanism of the present invention is particularly adapted for use in a citrus fruit sectionizing machine of the type disclosed in the co-pending U.S. application of H. W. Grotewald, Ser. No. 730,335, filed April 23, 1958 and assigned to the assignee of the present application.

In general, the machine comprises a frame support structure 20 (FIG. 1) made up of channels and angle members rigidly welded together. The peeled and treated grapefruit, which are to be sectionized, are advanced on a supply conveyor A (FIGS. 1 and 2) to a position within reach of an operator, who stands in front of a feed turret B and places each grapefruit on the feed turret at station C of the turret. The feed turret B is intermittently indexed through 90° angular increments in a clockwise direction (FIG. 2) to bring each grapefruit to a transfer station D where the grapefruit is automatically transferred from the feed turret B to a transfer turret E which is also arranged to be intermittently indexed in 90° increments in synchronism with the movements of the feed turret B, but in a counterclockwise direction. The grapefruit is then moved to a seed disturbing station F and then to a second transfer station G where it is deposited in one of a plurality of fruit carriers 35 (FIG. 1) mounted on a main turret H. The main turret H is arranged to be intermittently indexed through 45° angular increments in a clockwise direction (FIG. 1) to move each grapefruit successively into operative association with a seed disturber unit 40 (FIG. 2) and with first, second, third and fourth heads 41, 42, 43 and 44, respectively, which are carried by and project downwardly from a vertically movable tool carrier or top plate P. Each head has a plurality of blades which will be described presently, that are arranged to be vibrated rapidly in a vertical direction as they are moved downwardly into a grapefruit to separate the pie-shaped meat segments from the membranes enclosing them. The sectionized grapefruit, with the separated segments disposed around the core, is then brought under a spinner or stripper unit 45 (FIG. 1) that wraps the radial membranes around the stationary core, causing any remainnig bond between the membranes and the segments to be completely broken and causing the segments to drop onto a discharge conveyor 46. The core is then moved to a position under a core stripping mechanism 47 which removes the core from the fruit carrier.

The mechanisms of the machine, including the supply conveyor A, the feed turret B, the transfer turret E, the main turret H, the discharge conveyor 46, and the drive mechanism for the conveyors and turrets, is substantially identical to those disclosed in the above-mentioned Grotewald application, and reference may be had to said application for a complete description of the construction and operation of these mechanisms. The present invention differs from the Grotewald machine in the use of a blade vibrating mechanism, an improved blade, improved apparatus for controlling the movement of the blade, and an improved coordination of all the elements of the machine.

The drive mechanism includes a barrel cam 75 (FIG. 1) which is operatively connected through a Geneva drive mechanism (not shown) to the main turret H to intermittently move the turret in 45° angular increments about a vertical axis, and is operatively connected through a push rod 74 (FIG. 2) to the tool-carrying plate P to reciprocate the plate vertically in timed relation with the movement of the main turret. The main turret H carries eight of the above-mentioned, equally-spaced, prong-type fruit carrier units 35 (4 only being shown in (FIG. 1) on which the grapefruit are carried. A band type clamping mechanism 76 is associated with each carrier unit for holding each grapefruit in compact form and in a predetermined orientation as it is carried through the machine on one of the intermittently moving carrier units. The construction and operation of the units 35, the clamping mechanisms 76, and the associated mechanisms are described in the above-mentioned Grotewald application.

The present invention is particularly concerned with an improved method of separating the pie-shaped segments of the grapefruit from the enclosing membranes by moving a plurality of specially designed separator blades down through the grapefruit and vibrating the blades during the downward movement. To carry out this vibrating sectionizing operation, the heads 41–44 are arranged to support the blades for vertical reciprocation and to control the horizontal movement of the blades as they are vibrated. Since all of the four heads are identical structurally, a description of head 41 will suffice to describe the construction and operation of all heads.

When a grapefruit in one of the carrier units 35 is moved to a station K (FIGS. 2 and 3), it is positioned directly under the first head 41 which will be described with particular reference to FIGURES 4–7. The head 41 comprises a carrier for the sectionizing instruments in the form of a gear housing 100 (FIGS. 3 and 4) which has a bottom wall 101, an inner cylindrical wall 102, and an outer cylindrical wall 103. The gear housing is secured to the underside of the tool carrying plate P by means of cap screws 107 (one only being shown in FIG. 3) and by suitable bolts (not shown) that secure upwardly projecting tabs of the gear housing to the upstanding side wall 108 of the top plate P. The head carries six sectionizing blades and, accordingly, six outer guide tubes 109 (FIG. 4) are integrally formed on the bottom wall 101 and project downwardly therefrom. The six outer tubes are formed on a common circle in equiangular spaced relation around the axis of a central cylindrical opening 112 in the gear housing. Each of the outer guide tubes 109 rotatably journals a shaft 115 to the upper end of which a pinion gear 116 is keyed by a setscrew. The six pinion gears 116 are in mesh with a ring gear 117 (FIG. 3) that rests on the bottom wall 101 of the gear housing and is arranged to be driven by a drive gear 120 that is keyed to a shaft 121 projecting upwardly through the top plate P and through a bushing 122 secured on the plate. It will be evident that rotary movement of the shaft 121 will cause rotary movement of the ring gear 117, the six pinion gears 116, and the pinion gear shafts 115.

A blade control mechanism 149 (FIG. 7) is mounted on the lower end of each pinion gear shaft 115 for the purpose of supporting the blade for vertical vibrating movement and controlling the swinging of the blade in a horizontal plane. The mechanism 149 includes a hub 150 that is freely journaled on the lower end of the associated pinion gear shaft 115. The hub 150 has oppositely projecting arms 151 and 152, the arm 151 being disposed between two upstanding arms 155 and 156 of an actuating member 157 on which a split collar 158 is integrally formed. A bolt 159 is arranged to clamp the collar 158 on the shaft 115 so that the stop member will rotate with the shaft 115 and so that rotary adjustment of the member 157 relative to the shaft 115 can be made by unclamping the collar. The other arm 152 of the hub 150 is secured by bolts 162 to a depending member 163 of a rigid frame 170 which includes a pair of spaced vertical bars 171 and 172, a transverse bar 173, and the above-mentioned depending bar 163, all secured together as by welding to form the rigid frame. An upper blade supporting yoke 185 is pivotally mounted on the upper end of the frame 170 by pins 186, and a similar lower yoke 187 is pivotally mounted on the frame by pins 188. The upper and lower yokes are pivotally connected to a blade support member or blade holder 190 by pivot pins 192 and 193, respectively. The support member 190 has two apertured, projecting arms 195 and 196 which rotatably journal a blade supporting rod 197. At its lower end, the rod 197 has a wedge-shaped groove 198 which wedgingly receives a sectionizing or stripper blade 200 which is also held on the rod by means of rivets 201. Two positioning collars 205 and 206 (FIG. 8) are secured to the shaft 197 for rotation therewith, the collar 205 being disposed above the projecting arm 196 and the collar 206 being disposed below said arm 196. The shaft 197 is urged to rotate in a clockwise direction (FIG. 7) by means of a torsion spring 210 which is anchored at its upper end 211 (FIG. 8) in the support member 190 and has a lower end 212 secured in an axially directed hole in the collar 205. The spring urges the shaft in a clockwise direction to bring an abutment arm 215, formed integrally on the collar 206, against a stop pin 216 that projects downwardly from the lower end of the blade support member 190.

As seen in FIG. 9, each of the blade control mechanisms 149 includes a tension spring 220 which has one end adjustably secured by a screw 221 to a support member 222 secured to the gear housing 100. The other end of the spring is hooked in a bar 225 secured to and projecting inwardly from the rigid frame 170. The spring 220 is so arranged that it urges the upper and lower yokes 185 and 187, and the blade 200 carried thereby in a counterclockwise direction about the axis of the pinon gear shaft 115.

The blades 200 of the head 41 are simultaneously vibrated in a vertical direction by means of a drive mechanism 300 (FIG. 4) which includes six links 301, each of which supports one blade and has a universal joint 302 near its upper end and an identical joint 303 near its lower end. The lower universal joint 303 includes a tubular member 306 (FIG. 6) which is secured by a cap screw 307 to an angle bracket 308 carried by the blade support member 190. A ball pivot member 310, carried by the lower end of the link 301, is disposed between two seat members 313 and 314 in the upper end of the tubular member 306. A tubular retaining member 316 is threaded in the upper end of the tubular member 306 to hold the members of the universal joint in operative association. The upper universal joint 302 is identical to the lower joint 303 but is secured to a carrier plate 320 (FIG. 4) that is mounted by means of nuts 322 on the lower end of an actuating rod 325. The rod 325 is journaled in bushings 327 and 328 disposed in a tubular mounting member 330. The tubular mounting member 330 is welded in a support plate 333 (FIG. 11) which is rigidly connected to the top plate P (FIG. 1) by means of a plurality of upstanding posts 334. The posts 334 hold the plate 333 in spaced relation to the tool carrying plate P and secure the plate 333 to plate P for vertical reciprocating movement therewith.

Referring to FIG. 4, it will be seen that the slidable actuating rod 325 is pivotally connected at its upper end to a connecting link 340 that is rotatably journaled by means of a bearing 341 (FIG. 5) on a stub shaft 342 formed eccentrically on one end of a short cylindrical shaft 345. The shaft 345 has, at its other end, a recess 346 that is disposed on the axis of shaft 345 and is adapted to receive an eccentric stub shaft 350 projecting from a drive shaft 351 that is journaled in a bearing assembly 352 (FIG. 4) which is mounted in fixed position on the plate 333. With this arrangement, as the drive shaft 351 is rotated, the connector link 340 and the actuating rod 325 that is mounted thereon are moved in a vertically reciprocating path. Since the connector 340 is adjustably mounted on the eccentric stub shaft 342, and since the short shaft 345 is adjustably mounted on the eccentric stub shaft 350, it is evident that the vertical reciprocating throw of the actuating rod 325 may be adjusted so that the length of vertical reciprocating stroke of the blade 200 carried at the lower end of the link 301 may be readily adjusted.

The drive shaft 351 is driven by a motor 400 (FIG. 11) through a pulley and drive mechanism 401 which includes a variable speed pulley 402, a pulley 403 which is keyed to a shaft 404 and a belt 405. The shaft 404 drives a shaft 408 through a belt and pulley arrangement 409, and the shaft 408 in turn drives the shaft 351 through a belt and pulley arrangement 410. The shaft 408 is supported in fixed spaced relation to the shaft 404 by means of two rigid spacer rods 412 and 413 (FIG. 12) which are interconnected by a clamp 414. At one end, the rods 412 and 413 have hub portions that are pivotally mounted on the shaft 404 and at the other end they are provided with hub portions pivotally mounted on the shaft 408. Similarly, the shaft 408 is held in fixed spaced relation to the shaft 351 by means of two rigid rods 420 and 421 (FIG. 11) which are interconnected by a clamp 422. At one end, the rods 420 and 421 are pivotally mounted on the shaft 408 and, at the other end, they are pivotally mounted on the shaft 351. With this arrangement the mounting plate 333 is permitted to move up and down with the top plate P while the shaft 351 is continuously driven by the motor 400 at the desired speed. In FIG. 11 the vibrator mechanism is shown in the position it assumes when the plate 333 is in its uppermost position, while in FIG. 12 the mechanism is shown when the plate 333 is in the lowermost position.

In addition to driving the vibrating connector link 340 associated with head 41, the shaft 351 also is connected by means of an eccentric mechanism 429 (FIG. 11) with a connector link 430 which is connected to the associated carrier plate 320 from which the six blades of head 44 depend.

The shaft 351 drives a second shaft 440 (FIG. 11) through a belt and pulley arrangement 441, and the shaft 440 is connected to two connector members 442 and 443 through eccentric mechanisms 444 and 445, respectively. The connector 442 is associated with the blade carrier plate 320 of head 42, and the connector 443 is associated with the blade carrier plate 320 of the head 43. Thus, as the shaft 351 is driven by the motor 400, all four connector members 340, 430, 442, and 443 are vertically reciprocated to carry the associated blade assemblies in a vertical reciprocating path. In one successful installation the blades were reciprocated about 2750 times per minute with a stroke of approximately 9/64 of an inch.

The speed of rotation of the eccentric drive shafts 351 and 440 may be regulated by shifting the motor 400 relative to a support platform 450 on which it is mounted. For this purpose the motor 400 is secured to a pair of angle bars 451 (FIG. 11) which are disposed on rods 452 of the support plate 450. A crank 453 is secured to the end of a screw 454 that threadedly engages the angle bars to shift them relative to the plate 450.

When the head 41 is moved down toward a fruit on the main turret, a hold-down member 500 (FIG. 4) comes into contact with the upper surface of the grapefruit, and exerts a downward pressure thereon, tending to hold the grapefruit in a fixed position as the blades move downwardly through the grapefruit and also as the blades are withdrawn upwardly out of the grapefruit at the end of their vertical reciprocating movement through the fruit. The hold-down member 500 is mounted on the lower end of a rod 501 which is slideably journaled near its upper end in a bearing 502 that is carried in a sleeve 503 depending from an adjustable mounting bracket 504. The bracket 504 includes two bars 506 (FIG. 2), each of which is secured by a bolt 507 to the top plate P. A central strap 509, that is adjustably secured to the two side members 506 by bolts 510, carries the depending sleeve member 503 (FIG. 4). The members of the bracket 504 are so adjusted that the axis of the tubular member 503 is disposed on the axis of the opening 112 of the gear housing so that the hold-down member 500 is arranged to be reciprocated in a vertical direction centrally of the six blade assemblies. At its upper end, the rod 501 is secured by a set screw 518 to a cylindrical weight 520 that is slidably mounted inside a mounting tube 521 which is secured at its upper end in a carrier plate 525. The plate 525 is supported by a plurality of rods 526 (one only being shown) that are adjustably secured in a plate 527. Plate 527 has a hub 527a which is adjustably secured against rotation on the fixed tubular member 330 and against vertical movement relative to the tubular support member 330 by means of a split collar 528 and a bolt 529. A screw 535 which is carried by the weight member 520 is disposed in a slot 536 in the mounting tube 52 to prevent rotation of the hold-down member 500.

The sectionizing blade 200, which is particularly shown in FIGS. 13–17, is preferably made of a material that has a hard smooth surface such as stainless steel. The blade has an upper flat body portion 560 (FIG. 13) which is approximately 1⅛" wide and 1/32" thick. While a width of 1⅛" has given satisfactory results it will be understood that the blade must in general be wider than the radial extent of the pie-shaped segments of the particular grapefruit being processed so that, when the blade is moved downwardly through the grapefruit, it will engage each segment along its entire radial extent to separate the segment from the radial membrane without requiring any radially outward movement of the blade. The body portion 560 has a lower tapering portion 561 which has a substantially straight edge 562 and a slanted edge 563 that is formed on the arc of a circle having a radius of approximately seven inches. At the lower end of the blade, a toothed probe or cutter 570 is formed, said probe being twisted out of the plane of the body portion 560 at an angle Z of approximately 56° relative thereto, as particularly shown in FIG. 15. The probe has a lateral dimension X (FIG. 16) of approximately ⅛", and a longitudinal dimension Y of approximately ⅝". The lower end of the probe has two edges 571 and 571a cut off at angles Z1 and Z2 of approximately 45°, and the extreme lower end 572 is relatively blunt and is formed with a radius. The rounded lower edge of the blade is so designed that it will not pierce grapefruit seeds or membranes that might be in its path. Further, the slanted edges 571 and 571a will cause the blade to be deflected sidewise and pass down alongside such objects. As seen in FIGS. 16 and 17, a plurality of notches 573 are formed in the probe by cutting slots in one edge 574 of the probe at an angle of approximately 45° relative to the plane of the probe. Thus, downwardly extending cutting edges 575 are formed along one side of the probe, and upwardly projecting cutting edges 576 are formed on an opposite side of the probe. The slots 573 are so formed that a ridge 577 is defined between opposed slanted bottom walls of the slots. It is to be noted that the cutting edges are disposed inwardly of the side edge 574 which remains relatively blunt.

While the embodiment disclosed herein, in which four processing heads 41–44 are used and each head carries six sectionizing blades, has been particularly effective, it will be understood that other combinations, such as five heads having five blades each, may be used. A multiplicity of blades is used to assure that every pie-shaped segment, which vary in number from nine to sixteen in grapefruit, will be pierced by a blade and separated from its associated radial membranes. To obtain an advantageous engagement of the grapefruit as it is successively positioned under the four heads 41, 42, 43, and 44, the blades of each head are arranged with a particular orientation relative to the blades of the other heads, as indicated diagrammatically in FIG. 18. As seen in this view, the probes or cutters 570 of the blades are positioned close to and substantially tangent to the associated hold-down member 500 when the blades of the head are in position to be moved down into a grapefruit. Also, it will be noted that the body portion 560 of the blade is disposed at an angle of approximately 24° to a radial plane normal to the probe.

In FIG. 18, the blades 200 of head 41 are disposed at 60° intervals in a circular pattern around the central fruit hold-down member 500 with the probe 570 of one of the blades being disposed in a plane 600 which extends radially from the axis of rotation W of the main turret H through the center of the hold-down member 500. Similarly blades 200a of the sectionizing head 42 are disposed at 60° intervals around a hold-down member 500a with the probes of two adjacent blades 200a′ and 200a″ being disposed 30° from a radial plane 601 extending through the axis of the main turret and the center of the cylindrical hold-down member 500a of the head 42. The third sectionizing head 43 comprises a plurality of blades 200b disposed at 60° intervals around a cylindrical hold-down member 500b to which the probe portion of the blades are substantially tangent. The probe portion of one of the blades, indicated by reference numeral 200b′, enters the grapefruit at a point disposed 45° clockwise from a radial plane 602 passing through the center of the main turret and the center of the head 43, while the probe of an adjacent blade is disposed 15° counterclockwise from said plane. The fourth head 44 has six blades 200c disposed at 60° intervals in a circular pattern around a central cylindrical hold-down member 500c. A blade 200c′ is disposed 15° clockwise (FIG. 18) from a radial plane 603 passing through the center of the main turret and through the center of the head 44, and an adjacent blade is disposed 45° counterclockwise from said radial plane. Accordingly, it will be seen that the blades of the several heads are so oriented relative to each other that they will penetrate into different segments of the grapefruit so that all segments of the grapefruit will be penetrated by the blades as the grapefruit is indexed under the heads 41–44, consecutively. It will also be noted that in heads 41 and 42 the body portion 560 of each blade 200 is disposed clockwise from a radial plane passing through the probe 570 of the blade, while in heads 43 and 44 the body portion of each blade is disposed counterclockwise from a radial plane passing through the probe. The blades are arranged in this manner because in heads 41 and 42 the blades are disposed to separate the meat segments from a forward membrane, such as membrane FM (FIG. 19) associated with segment S, while the blades of heads 43 and 44 are arranged to engage rear membranes such as membrane RM.

In FIG. 19 the initial position of the probe 570 and the body portion 560 of one of the blades 200 of head 41 is indicated diagrammatically and is shown in an assumed position relative to two membranes M1 and M2 of a grapefruit GF. The control mechanism 149 associated with the blade is indicated in phantom lines. When the probes of head 41 are moved down into the grapefruit about one-half inch, the downward movement of the probes is stopped and each probe is swung in a counterclockwise direction about the axis of shaft 115 until it engages an adjacent membrane M. Then the downward vibrating movement of the blade is resumed. The probes of the blades are moved in a clockwise direction about shafts 115 to the above-mentioned initial position by means of a cocking mechanism 615 which is particularly shown in FIGS. 3 and 10.

The cocking mechanism 615 is mounted on top of the tool carrier or top plate P. Referring to FIG. 3 it will be noted that the ring gear 117 of each of the four sectionizing heads is in mesh with the drive gear 120 which is keyed to one of the shafts 121. This cocking mechanism 615 is substantially identical to that disclosed in the above-mentioned Grotewald application and in general comprises a slide bar 622 which is mounted for sliding movement on the top plate P. This sliding movement from left to right in FIGS. 3 and 10 is accomplished by a linkage which includes a push rod 623 (FIG. 10) which is pivotally connected to an upstanding ear 624 of the slide bar 622 and is pivotally connected to a cam follower arm 625. The arm 625 is pivotally mounted by means of a pin 626 to an upstanding post 627 of the top plate P, and has a follower roller 628 which is disposed in a cam slot 629 of a rotary cam 630 which is keyed to a shaft 631. As seen in FIGS. 1 and 3, the shaft 631 is disposed in a generally horizontal position and is arranged to be rotated continuously by the drive mechanism of the machine.

A lever 642, which is pivotally mounted by a capscrew 643 on the slide bar 622 has one end connected by a short link 640 to an arm 638 which is clamped on the drive gear shaft 121 of head 41. The arm 638 is connected by a link 636 to an arm 637 that is keyed on the drive gear shaft 121 of head 42. The arm 637 of head 42 is connected by a link 639 to an arm 647 keyed to drive gear shaft 121 of head 43. Similarly, an arm 648 keyed to the drive gear shaft 121 of head 44 is connected by a link 649 to an extension 647a of the arm 647. With this arrangement when the lever 642, that is mounted on the slide bar 622, is pivoted counterclockwise (FIG. 3) about capscrew 643, the drive gear shafts 121 of all heads will be actuated, the shafts 121 of heads 41 and 42 being rotated clockwise while the shafts 121 of heads 43 and 44 are rotated counterclockwise.

The lever 642 is moved to the cocked, full-line position shown in FIG. 3 by the movement of the slide bar 622 toward the right under the control of the cam track 629 which is so designed that when the cam follower roller 628 reaches a position indicated by radial line 633, the slide bar starts to move toward the right. This movement is completed when the roller reaches position 634. The slide bar remains at this position until position 635 is reached, at which time the slide bar begins to move toward the left allowing the drive gear shafts 121 to be rotated in an opposite direction. The slide bar remains at its leftmost position until the roller reaches position 633 and thereafter the slide bar is moved again toward the right.

When the slide bar 622 is at the left end of its stroke, the cocking lever 642 is normally held substantially in the phantom line position of FIG. 3 by a spring 670 which is disposed around a rod 671 between the lever 642 and an abutment 673 adjustably secured to a plate 674 fixed to the slide bar. The rod 671 is secured to the lever 642 and is slideably disposed in an opening 677 in the adjustable abutment member 673. During the movement of the slide bar to the right (FIG. 3), the lever 642 contacts an end 680a of an arm 680 that is pivotally mounted on an upstanding rod 681 of the second seed disturber unit 40. The lever 680 is urged in a counterclockwise direction by a spring 684 to the position of FIG. 3 against a stop pin 685 projecting upwardly from the top plate P. The lever 680 has a hub 680b in which a depending tube (not shown) is secured. The tube is journaled for rotation in a bearing 690 secured to the top plate P and has a release arm 691 (FIG. 3) projecting radially outwardly therefrom. A roller 693 is mounted on the outer end of the arm 691 directly above a post 696 which is mounted in a stationary position on a flat bar 697 which is secured to a vertical tubular bearing member 698 at the seed disturbing station.

When the cocking lever 642 contacts the end of lever 680 at the end of the movement of the slide bar toward the right, the lever 642 is pivoted counterclockwise about capscrew 643 against the resistance of spring 670 and is moved into contacts with a stop pin 702 on the plate 674. This pivoting movement of the lever 642 causes the pinions 116 of heads 41 and 42 and the shafts 115 to be rotated a few degrees in a clockwise direction so that the several blade control units 149 are moved to a spring loaded cocked position shown in full lines in FIG. 19. Similarly, the pinions 116 of heads 43 and 44, and the shafts 115 of those heads are rotated a few degrees in a counterclockwise direction to a spring loaded, cocked position at which they are lowered down into the grapefruit. While the slide bar is held at the right side of top plate P, the plate P is lowered a predetermined distance and held in that position for a short time by the barrel cam of the drive mechanism. This downward movement brings the probe about ½" into the grapefruit and brings the roller 693 (FIG. 3) of the release arm 691 into engagement with a slanted camming surface 705 formed on the post 696. The camming surface causes the arm 691 to be swung clockwise (FIG. 3) about the axis of rod 681, moving the end 680a of the arm 680 out of contact with lever 642. The spring 670 quickly swings the lever 642 clockwise, causing the pinion gears to be rotated, whereby the probe of each blade 200 is moved in a direction generally tangent to the hold-down member 500 from the full line position of FIG. 19 to the phantom line position. This preliminary sidewise movement of the blade, which may also be considered as being in a direction generally normal to a radial plane of the grapefruit, causes the probe, which is held at an elevation wherein it projects down in the grapefruit for a distance of about one-half inch, to move toward and into engagement with the adjacent membrane of the grapefruit. It is to be noted that at this time the blade is being vibrated rapidly in a vertical direction and, accordingly, the sharpened edges 575 and 576 of the probe portion of the blade cut their way across the apex end of the pie-shaped segment to the adjacent membrane under the urging of the associated tension spring 220 (FIG. 9). It is to be noted that, while the cutting edges are provided adjacent the side edge 574 of the blade, the side edge itself is flat or blunt so that, when it contacts the membrane, it will not cut into the membrane but will be stopped thereby. Referring again to FIG. 19 it will be noted that, in the dotted line position, the body portion of the blade 200 will be disposed over the adjacent membrane M1 against which the probe has moved. Then, when the blade is moved further downwardly through the grapefruit by the barrel cam, the lower curved edge 563 (FIG. 13) of the body portion of the blade will engage the upper edge of the membrane and will be progressively rotated counterclockwise (FIG. 19) on its rod against the resistance of the torsion spring 210 that is disposed around the rod. Thus as the blade moves downwardly in its vibrating motion through the grapefruit segment, the blade is kept in close contact with the membrane by the action of the torsion spring and by the fact that the blade overlies the membrane and is progressively moved toward a position of parallelism with the membrane.

In FIG. 9 the six blade control units 149 are shown in the cocked position. It will be noted that the arm 156 of each actuating member 157 is in engagement with the associated arm 151 of the hub 150. Then, when the cocking mechanism is suddenly released and the pinion shafts 115 are rotated in the counterclockwise direction (FIG. 9), the arm 156 moves substantially to the dotted line position indicated in phantom lines on control unit 149'. The unit is then free to pivot under the urging of the spring 220 to cause the probe to move toward the adjacent membrane into contact therewith. It will be appreciated that the arm 156 must move sufficiently far to permit the probe to move into engagement the next adjacent membrane wall. It is also to be noted in FIG. 9 that, in head 41, the arms 151 and 152 of the hub 150 are disposed on one side of a radial plane extending through the associated shafts 115 and the center of the hold-down member 500. In heads 43 and 44, the arms 151 and 152 will be on the opposite side of said planes and each spring 220 will be disposed on the opposite side of the control unit 149 from the position shown in FIG. 9. Accordingly the springs 220 will tend to urge the units in a clockwise direction about the axis of shafts 115. Thus the blades of heads 41 and 42 are resiliently urged toward forward membranes of the grapefruit while the blades of heads 43 and 44 are urged toward rear membranes.

The adjustable mounting of the member 157 on the pinion shaft 115 makes possible the orientation of the blades of the various heads as indicated in FIG. 18. To make this initial adjustment of the blades the cocking mechanism is moved to the cocked position and the member 157 of each blade control unit is rotated to the position of FIG. 9 wherein the arm 156 has engaged arm 151 and pivoted the blade holder unit to the desired position.

In the operation of the machine, grapefruit are continuously fed to the machine until each of the carriers 35 has received a grapefruit and impaled it in a fixed position, with a clamp member 76 disposed around the periphery of the grapefruit. With the eccentric drive mechanism continuously vibrating the blades in a vertical direction and the plate P in its uppermost position, the slide bar 622 on top of the top plate is moved across the plate toward the right in FIG. 3 to rotate each pinion gear in a direction to move the associated blade holder to the spring-loaded cocked position indicated in FIGS. 18 and 19. Then, when the heads are moved downwardly and the blades have penetrated down into the grapefruit about three-eighths or one-half inch, the downward movement is stopped and the blade holders are released from their restrained or cocked position, causing the springs 220 to quickly move the blades toward the adjacent radial membrane of the grapefruit. During this sidewise or lateral movement, the probe on the blade cuts its way across the apex end of the grapefruit segment until it engages the membrane. The relatively blunt side face 574 of the probe does not penetrate the membrane but stops the sidewise movement of the probe when it engages the membrane. At this point, the barrel cam causes the blades to once more move downwardly through the grapefruit segment. During this downward movement, the torsion spring 210 associated with each blade urges the blade against the membrane of the grapefruit while the upper edge of the membrane engages the curved lower edge of the blade and rotates it in a direction to move it toward a position of parallelism with the membranes. Thus the blade is kept in close contact with the membrane of the grapefruit during the downward vibrating movement. Also, during the downward vibrating movement the meat segment is separated from the membrane, not by a cutting action, but by a series of blows which move the meat segment away from the membrane without rupturing the juice sacs at the surface of the meat segment.

When all of the blades have been carried downwardly through the grapefruit, the top plate P is moved upwardly to carry the blades out of the grapefruit. When the top plate is again in its uppermost position, the slide bar is moved toward the right to once more move the blades to their spring-loaded cocked position ready for the next downward movement of the blades.

From the foregoing description, it will be seen that the present invention provides a particularly effective apparatus for controlling the horizontal movement of a sectionizing blade while it is being rapidly vibrated in a vertical direction. The control unit 149 not only permits rapid vertical vibration of the blade support rod without bending of the rod, but also makes possible the movement of the blade in two horizontal directions, namely, movement about the axis of the associated pinion shaft 115 and movement about its own pivot axis under the urging of the torsion spring connected thereto.

While a mechanical eccentric drive mechanism has been disclosed, pneumatic, hydraulic, and electrical vibrating mechanisms have been successfully used for vibrating the blades. Also, while the vibrating mechanism and the efficient blade construction of the present invention has been shown associated with a grapefruit sectionizing machine, which includes a feed turret, a transfer turret and several seed loosening stations, it will be understood that the blade control mechanism of the present invention can be used on machines that do not incorporate all of these particular mechanisms.

It will be understood that modifications and variations may be effected without departing from the scope of the novel concepts of the present invention.

Having thus described our invention, what we claim as new and desire to protect by Letters Patent is:

1. In a citrus fruit sectionizing machine, the combination of means for holding a fruit with its axis in fixed generally vertical position, a sectionizing blade having a flat body portion with a probe projecting therefrom, means for moving said blade along a predetermined path generally parallel to the axis of the fruit to bring the probe to a position a predetermined distance in the fruit and between adjacent radial membranes of the fruit, means for moving said blade laterally of said path to bring said probe against a radial membrane of the fruit, and means for vibrating said blade, in a generally vertical direction during said lateral movement.

2. In a citrus fruit sectionizing machine, the combination of means for supporting a citrus fruit with its stem blossom axis disposed in a substantially vertical direction, a blade positioned above said fruit and mounted for movement downwardly toward said fruit and for movement in a horizontal direction, means for moving said blade downwardly to penetrate the fruit to a predetermined depth and hold said blade at said depth, means for moving said blade in a horizontal direction toward a membrane in the fruit, and means for vibrating said blade generally vertical during said downward and said horizontal movement.

3. In a citrus fruit sectionizing machine, the combination of a blade, vibrating means having a reciprocating member connected to said blade and mounted for movement in a vertical direction, a blade holder mounted for vertical movement and for swinging movement in a horizontal plane, and means operatively connecting said blade to said blade holder whereby said blade is movable in a vertical direction with said reciprocating member and in a horizontal direction with said swinging blade holder and vibrated during said horizontal movement.

4. In a citrus fruit sectionizing machine, a sectionizing blade, means for vibrating said blade in a substantially vertical direction, a pair of spaced blade control arms mounted for movement in generally horizontal planes and operatively connected to said blade to move said blade in a first substantially horizontal direction, and including means defining a substantially vertical pivot axis and mounting said blade for movement about said axis relative to said arms in a second horizontal direction, and a linkage mounting said blade on said vibrating means including universal pivoting joints permitting movement of said blade horizontally in more than one direction as it is vibrated.

5. In a citrus fruit sectionizing machine, a sectionizing blade, means for moving said blade in a vertical direction to a position in which a portion of the blade is embedded in a fruit, means for moving said blade in a horizontal direction while said blade is embedded in the fruit, and means for vibrating said blade in a vertical direction during said horizontal movement including a link having a universal joint at each end thereof.

6. In a citrus fruit sectionizing machine, a blade holder, means mounting said blade holder for vertical reciprocating movement and for movement in a substantially horizontal plane, a rod mounted in said holder for rotation about a substantially vertical axis, a sectionizing blade secured to said rod for vertical reciprocating movement therewith, and a torsion spring connected between said blade holder and said rod for rotating said rod in a predetermined direction around the axis of said rod.

7. In a citrus fruit sectionizing machine, a support member, a blade holder mounted for vertical reciprocating movement relative to said support member, means including a vertical shaft rotatable in said support member and mounting said holder for movement in a horizontal plane, a rod mounted in said holder for rotation about a vertical axis, a tension spring operatively connected between said support member and said blade holder for urging said holder to swing in a predetermined direction around said shaft, a torsion spring connected between said rod and said holder for rotating said rod in a predetermined direction around the axis of said rod, and means for rapidly reciprocating said blade holder in a vertical direction.

8. In a citrus fruit sectionizing machine, a blade holder mounted for pivotal movement in a horizontal plane, a blade mounted on said blade holder, means for moving said blade holder through a vertically reciprocating path during said horizontal movement, said means including a universal joint connected to said blade holder, a link connected to said universal joint and projecting upwardly therefrom, a universal joint connected to the other end of said link, and an eccentric drive mechanism connected to said other universal joint.

9. In a citrus fruit sectionizing machine, a blade control mechanism comprising a shaft, a rigid frame pivotally mounted on said shaft, a pair of spaced support arms pivotally mounted on said frame, a blade support member connected between the outer free end of said pivotal support arms, means for supporting a blade on said blade support member, and means for oscillating said pivotal support arms in a vertical direction relative to said frame.

10. In a citrus fruit sectionizing machine, a shaft, a rigid frame pivotally mounted on said shaft, a parallelogram linkage pivotally mounted on said frame, means for supporting a blade on said parallelogram linkage, means for rapidly moving said parallelogram linkage in a vertical direction, and means for pivoting said frame relative to said shaft as said parallelogram linkage is pivoted in a vertical direction.

11. In a citrus fruit sectionizing machine, a shaft, a rigid frame pivotally mounted on said shaft and having an arm projecting outwardly therefrom, a parallelogram linkage pivotally mounted on said frame, a blade mounted on the outer end of said parallelogram linkage, a stop mechanism adjustably keyed to said shaft for rotation therewith and having an upstanding arm disposed alongside said frame arm, and means for rotating said shaft through a predetermined angular movement causing said stop arm to engage the arm of said frame and rotate said frame a predetermined angular distance relative to said shaft.

12. In a citrus fruit sectionizing machine, a shaft, gear means connected to said shaft for rotating the same, a rigid frame pivotally mounted on said shaft and having an outwardly projecting abutment arm, a parallelogram linkage pivotally connected to said frame, a blade carried by said parallelogram linkage, a stop member keyed to said shaft for rotation therewith and having an actuating arm disposed alongside said frame abutment arm, means for rotating said gear means in a predetermined direction to rotate said shaft and move said actuating arm against said frame abutment arm to pivot said frame a predetermined angular distance in a first direction relative to the axis of said shaft, and spring means connected to said frame and arranged to resist the pivoting movement of said frame under the urging of said actuating arm.

13. In a citrus fruit sectionizing machine, a shaft, gear means connected to said shaft for rotating the same, a rigid frame pivotally mounted on said shaft and having an outwardly projecting abutment arm, a parallelogram linkage pivotally connected to said frame, a blade carried by said parallelogram linkage, a stop member keyed to said shaft for rotation therewith and having an actuating arm disposed alongside said frame abutment arm, means for rotating said gear means in a predetermined direction to rotate said shaft and move said actuating arm against said abutment arm to move said frame a predetermined angular distance in a first direction relative to the axis of said shaft, spring means connected to said frame and arranged to resist the pivoting movement of said parallelogram linkage under the urging of said stop means, and means for quickly reversing the movement of said gear means to permit said spring means to pivot said frame and the connected parallelogram linkage in an opposite direction.

14. In a citrus fruit sectionizing machine, the combination of a stripper member having an upper blade portion with a rod projecting downwardly therefrom, said upper blade portion being flat and having a width measured transversely of said rod that is greater than the length of the radial membrane to be processed, means for positioning said stripper member above a fruit with said rod directly above the apex of a pie-shaped meat segment and the blade portion projecting generally radially outwardly from the axis of the fruit, means for moving said stripper downwardly to cause said rod to penetrate a predetermined distance into the apex of the fruit segment, means for moving said stripper laterally to bring said rod against the adjacent membrane and to position said blade portion in a generally parallel relation with the membrane, and means for moving said stripper downwardly through the fruit to cause said upper blade portion to separate the membrane from the adjacent meat segment during downward movement of said blade.

15. In a citrus fruit sectionizing machine, the combination of a stripper member having an upper blade portion with a rod projecting downwardly therefrom, means for positioning said stripper member above a fruit with said rod directly above the apex of a pie-shaped meat segment and the blade portion projecting generally radially outwardly from the axis of the fruit, means for moving said stripper downwardly to cause said rod to penetrate a predetermined distance into the apex of the fruit segment, means for moving said stripper laterally to bring said rod against the adjacent membrane and to position said blade portion in a generally parallel relation with the membrane, means for moving said stripper downwardly through the fruit to cause said blade to separate the membrane from the adjacent meat segment, and means for vibrating said blade during said lateral and said downward movements.

16. In a citrus fruit sectionizing machine, a stripper member having an upper blade portion and a lower depending probe, said upper blade portion having a width greater than the radial length of the membrane of a fruit being processed, means for positioning said stripper above a pie-shaped meat segment adjacent the apex thereof with said upper blade portion projecting generally radially outwardly from the axis of the fruit, means for moving said stripper downwardly toward the fruit to move said probe to a position a predetermined distance into the fruit and hold said probe at said position in the fruit, means for vibrating said stripper, means for moving said vibrating stripper laterally to move said probe against an adjacent membrane, and means for moving said vibrating stripper downwardly through the fruit to cause said blade to separate said membrane from the adjacent meat segment.

17. In a citrus fruit sectionizing machine, the combination of a flat blade having a slanted lower edge, means for positioning said blade above a fruit with the lowermost edge of said lower edge penetrating a pie-shaped segment of the fruit near the apex thereof and with the remainder of the edge overlying the adjacent radial membrane at an acute angle relative thereto, means for moving said blade downwardly through the fruit and including a support member, a blade control member pivotally mounted in said support member and connected to said blade and arranged to mount said blade for swinging movement in a predetermined direction in a horizontal plane, a first spring connected between said support member and said control member to urge said blade in said predetermined horizontal direction during vertical movement of the blade, and a second spring connected to said blade and arranged to urge said blade to a position overlying said membrane but arranged to permit said blade to swing in an opposite direction toward a position of parallelism with said membrane as successive portions of said slanted lower edge engage the upper edge of said membrane to cam said blade in said opposite direction.

18. In a citrus fruit sectionizing machine, a plurality of parallel rotary shafts mounted in a circular pattern around an axis of symmetry, a blade control unit pivotally mounted on each shaft, a blade support rod rotatably mounted on each control unit, a blade secured to each rod, an adjustable stop member operatively connected between each shaft and the associated control unit for adjusting each control unit on the shaft to orient said unit relative to said axis of symmetry, and means for adjusting the position of each blade on its control unit including a collar keyed to the blade support rod, an arm on said collar, an abutment pin on the control unit, and a torsion spring operatively connected between said control unit and said collar to urge said arm against said abutment pin.

19. In a citrus fruit sectionizing machine, a plurality of parallel rotary shafts mounted in a circular pattern around an axis of symmetry, a blade control unit pivotally mounted on each shaft, a blade rotatably mounted on each control unit, means for adjusting each control unit on the associated shaft to orient said control unit relative to said axis of symmetry, and means for adjusting the position of each blade on the associated control unit to orient the blade relative to the axis of symmetry including an abutment member on said blade and an abutment member on said control unit, one of said members being adjustably mounted, and spring means operatively connected between said control unit and said blade and arranged to effect abutting engagement of said members to determine the adjusted position of said blade.

References Cited in the file of this patent

UNITED STATES PATENTS

| | | |
|---|---|---|
| 1,923,474 | Bem | Aug. 22, 1933 |
| 2,129,101 | Polk | Sept. 6, 1938 |
| 2,240,910 | Polk et al. | May 6, 1941 |
| 2,558,579 | Polk et al. | June 26, 1951 |
| 2,560,128 | Polk et al. | July 10, 1951 |
| 2,682,289 | Brown | June 29, 1954 |